United States Patent [19]
Birglechner

[11] 3,762,899
[45] Oct. 2, 1973

[54] METHOD OF MANUFACTURING SEMICONDUCTOR COMPONENT

[75] Inventor: Georg Birglechner, Mondsee, Austria

[73] Assignee: Telefunken Patentverwertungsgesellschaft m.b.H., Ulm/Donall, Germany

[22] Filed: June 24, 1971

[21] Appl. No.: 156,243

[52] U.S. Cl. .......................... 65/42, 29/587, 29/588, 29/590, 65/59, 156/329
[51] Int. Cl. .......................................... C03b 23/20
[58] Field of Search ..................... 29/587, 588, 590; 156/299, 329; 65/42, 59

[56] References Cited

UNITED STATES PATENTS

| | | | |
|---|---|---|---|
| 2,688,110 | 8/1954 | Domaleski et al. | 29/588 X |
| 2,736,847 | 2/1956 | Barnes | 29/590 X |
| 2,948,050 | 8/1960 | Vessem et al. | 29/587 |
| 3,181,229 | 5/1965 | Haberecht et al. | 29/588 |
| 3,577,633 | 5/1971 | Homma | 29/588 |
| 3,658,618 | 4/1972 | Gramann | 156/299 X |

*Primary Examiner*—Robert L. Lindsay, Jr.
*Attorney*—Spencer & Kaye

[57] ABSTRACT

A method of manufacturing a semiconductor component includes the steps of applying a liquid insulating substance to an electrode, the insulating substance being selected such that a semiconductor element applied thereto adheres to the electrode, and pressing the electrode against a further electrode with the semiconductor element between them so that the semiconductor element is retained and electrically contacted by the two electrodes.

7 Claims, 2 Drawing Figures

Inventor:
Georg Birglechner
BY Spencer & Kaye
ATTORNEYS.

METHOD OF MANUFACTURING SEMICONDUCTOR COMPONENT

BACKGROUND OF THE INVENTION

The invention relates to a method of manufacturing a semiconductor component in which the semiconductor is disposed between two electrodes, which are arranged on both sides of the semiconductor body. In most cases, at least one electrode will be so constructed that its contact surface makes contact with the semiconductor body over a large area. This particular kind of construction of semiconductor components is used mainly with diodes, but is obviously not restricted to such an embodiment.

However, prior known methods used in the manufacture of these components are rather time wasting and expensive, mainly due to the fact that they require a large number of steps which can be carried out only by hand and cannot, therefore, be adapted to automation.

Thus, for example, when making a diode enclosed in a tubular glass envelope, the previously used method has been to fit a centering tube into the envelope, which is provided at one end with an electrode applied by a melting process, and the diode element is then impelled through this tube into the envelope. Then, the centering tube is removed and the position of the element is checked. Next, a second electrode, which is axially resilient in order to produce a sufficient contact pressure and which is usually called a whisker, is introduced into the envelope and fixed in place by melting the glass. All these processes must be carried out by hand. This method also has the additional disadvantage that when the centering tube is removed, in about 20 per cent of components under construction the diode element is drawn out of contact with the electrode already fixed in the housing, and these elements then must be reapplied. Finally, in this type of manufacturing process it is possible some of the elements will make only partial contact with the whisker, due to bad centering, so that the resulting high mechanical stresses may lead to the breakdown of the element. Furthermore, the diodes made by this method are very sensitive to acceleration forces and may have fairly low blocking voltages because the *p*-ti n junctions are unprotected on the surface of the semiconductor.

For this reason, a method has been developed particularly for achieving high blocking voltages, in which the diode elements are embedded, prior to the assembly, in an insulating compound so that one surface of the diode is always free from insulating compound. However, also in this method the diode element must be mounted by hand in a housing in such a way that the free surface of the element is first placed on the electrode fixed in the housing and for then contacting the other surface, which is covered with insulating compound, a pointed electrode is pushed through the insulator into contact with the semiconductor. Since in this method the individual electrode elements usually have uneven surfaces when dipped into the insulating material so that the planar contact between its free surface and the electrode fitted in the housing is, therefore, not ensured, this method necessitates that the elements are soldered with their free surfaces to the electrodes already fixed in the housing. Although diodes made by this method have high blocking voltages, manual work is also necessary in this case in order to ensure the correct fitting of the elements.

SUMMARY OF THE INVENTION

It is an object of the present invention to provide a method whereby the manufacture of a component in which the semiconductor is held by two electrodes arranged on both sides of the semiconductor, may be substantially simplified and adapted to the requirements of automatic production.

According to the invention, there is provided a method of manufacturing a semiconductor component comprising the steps of applying to a face of a first electrode a liquid insulating substance, applying a semiconductor element to the liquid insulating substance, which substance is selected to be such that the semiconductor element will be adhered thereby to the first electrode, and pressing the first electrode and a second electrode together with the semiconductor element between them so that the semiconductor element is retained between the first and second electrodes and is electrically contacted thereby.

BRIEF DESCRIPTION OF THE DRAWINGS

The invention will now be described in greater detail, by way of example, with reference to the drawings, in which.

DESCRIPTION OF THE PREFERRED EMBODIMENTS

Figures 1, 2:
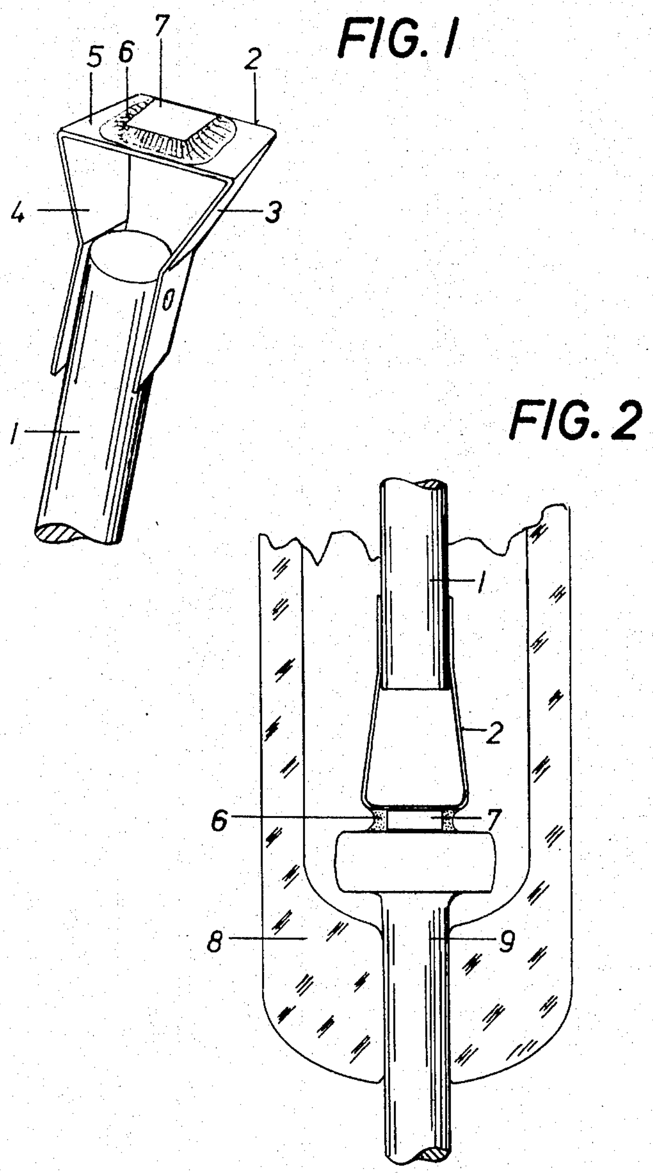
FIG. 1 is a perspective view of an electrode which initially carries the semiconductor element.
FIG. 2 is a sectional view of part of the completed semiconductor component showing the semiconductor element in the glass envelope between the two electrodes.

In a method for manufacturing a semiconductor component, the invention resides in that one side of an electrode is provided with a liquid insulating material which has the property that the semiconductor placed on the insulating material adheres to the electrode, and in that a second electrode is pressed on the other side so on the semiconductor located on the first electrode that the semiconductor is retained and contacted by both electrodes.

In a particularly preferred embodiment of the method of the invention, the quantity of insulating material applied to an electrode and/or its physical properties are so chosen that prior to the pressing on of the electrodes, the semiconductor floats in this insulating material. In this case, the adjustment of the semiconductor may be omitted because it is pulled into the center of the contact surface covered by this substance by the surface tension of the liquid insulator.

If the method according to the invention is applied to the manufacturing of diodes enclosed in tubular glass envelopes, first the first electrode, which is provided with the insulating material and the diode element, is introduced from one side into the glass vessel serving as housing, pressed against a second electrode fixed at the other end of the vessel, and then the first electrode is melted into the housing. Due to the compression used during this assembly, the insulator is displaced between the contact surfaces of the electrodes and the semiconductor thereby producing a good electrical contact between both electrodes and the semiconductor. For manufacturing reasons it is preferred that during the assembly, the open end of the housing points upwards, and the first electrode is introduced from the top into the housing.

The method according to the invention will now be explained with reference to FIGS. 1 and 2 of the accompanying drawing, showing two important stages of the method during the manufacturing of a diode.

FIG. 1 shows an electrode which is axially elastic in order to ensure a sufficient contact pressure between the electrodes and the semiconductor. The electrode shown in this figure comprises a lead 1 and a part 2 mounted with downwardly angled legs 3 and 4 on the lead 1. Elasticity in the axial direction is achieved in this electrode in that both legs 3 and 4 can deflect laterally underaxial pressure. Liquid insulating material 6 is now applied to the end face 5 of the part 2, and the semiconductor 7 is placed thereon. Then, the electrode with the semiconductor is introduced into a tubular glass envelope closed on one side with an electrode mounted by fusion.

FIG. 2 shows the component after the fitting of the semiconductor into the diode housing. In this figure the glass vessel is shown at 8 and the fused in electrode at 9. As may be seen from FIG. 2, the pressing on of the electrode against the semiconductor causes the insulating material to be displaced from the opposite contact surfaces and to be deposited on the side faces of the semiconductor providing an efficient cover of the *p-n* junctions which extend to the semiconductor surface in the case of planar diodes.

The method according to the invention can be further substantially improved by using as insulating material a substance which passes under heat, for example during the fusing of the electrodes into the housing, from the liquid into the solid state without releasing volatile constituents. Suitable insulating substances are, for example, substances based on silicone rubber. Good results have been obtained with a material which is commerically available under the designation "Sylgard."

It will be understood that the above description of the present invention is susceptible to various modifications, changes and adaptations.

What is claimed is:

1. A method of manufacturing a semiconductor component comprising the steps of: applying a liquid insulating substance to a face of a first electrode; placing a semiconductor element on the applied liquid insulating substance which substance is selected such that it causes the semiconductor element to adhere to the first electrode; placing a second electrode against the side of the semiconductor element opposite the first electrode; and pressing the first electrode, while the applied insulating substance is in a liquid state, and the second electrode together with the semiconductor between them so that the semiconductor element is held and directly electrically contacted by the first and second electrodes.

2. A method as defined in claim 1, wherein the physical properties of said liquid insulating substance and the amount to be applied to said first electrode are so selected that, upon placing said semiconductor element on said liquid insulating substance, said semiconductor element floats on said liquid insulating substance.

3. A method as defined in claim 1 and further comprising: prior to said step of pressing said first electrode against said second electrode, mounting said second electrode in one end of a glass tube serving as a housing for the semiconductor element and introducing said first electrode with said semiconductor element adhering thereto into said glass tube from the end opposite said second electrode; and after said step of pressing said first electrode against said second electrode, fusing said first electrode into said glass tube.

4. A method as defined in claim 3, wherein said first electrode is elastic in its axial direction so as to provide sufficient contact pressure between said electrodes and said semiconductor element.

5. A method as defined in claim 4, wherein, said insulating substance is a substance which passes, under the application of heat, from the liquid into the solid state without releasing volatile constituents.

6. A method as defined in claim 5, wherein said insulating substance is silicone rubber based.

7. A method as defined in claim 6, wherein said semiconductor element is a semiconductor diode.

* * * * *